United States Patent
Wiltamuth et al.

(10) Patent No.: US 8,001,523 B1
(45) Date of Patent: Aug. 16, 2011

(54) SYSTEM AND METHODS FOR IMPLEMENTING AN EXPLICIT INTERFACE MEMBER IN A COMPUTER PROGRAMMING LANGUAGE

(75) Inventors: Scott Wiltamuth, Seattle, WA (US); Anders Hejlsberg, Seattle, WA (US); Peter H. Golde, Bellevue, WA (US); Peter F. Sollich, Munich (DE)

(73) Assignee: Microsoft Corporation, Redmond, WA (US)

( * ) Notice: Subject to any disclaimer, the term of this patent is extended or adjusted under 35 U.S.C. 154(b) by 1736 days.

(21) Appl. No.: 09/900,123

(22) Filed: Jul. 5, 2001

(51) Int. Cl.
*G06F 9/44* (2006.01)

(52) U.S. Cl. .......................... 717/114; 717/108

(58) Field of Classification Search .......... 717/106–110, 717/114–118, 120–122
See application file for complete search history.

(56) References Cited

U.S. PATENT DOCUMENTS

| | | | |
|---|---|---|---|
| 4,558,413 A | 12/1985 | Schmidt et al. | |
| 4,965,743 A | 10/1990 | Malin et al. | |
| 5,481,712 A * | 1/1996 | Silver et al. | 717/109 |
| 5,586,329 A | 12/1996 | Knudsen et al. | |
| 5,632,022 A * | 5/1997 | Warren et al. | 715/776 |
| 5,680,619 A * | 10/1997 | Gudmundson et al. | 717/108 |
| 5,689,711 A | 11/1997 | Bardasz et al. | |
| 5,706,510 A | 1/1998 | Burgoon | |
| 5,781,730 A | 7/1998 | Reimer et al. | |
| 5,787,262 A | 7/1998 | Shakib et al. | |
| 5,805,899 A | 9/1998 | Evans et al. | |
| 5,812,773 A | 9/1998 | Norin | |
| 5,848,273 A * | 12/1998 | Fontana et al. | 717/108 |
| 5,872,973 A | 2/1999 | Mitchell et al. | |
| 5,878,432 A | 3/1999 | Misheski et al. | |
| 5,890,176 A | 3/1999 | Kish et al. | |
| 5,907,704 A | 5/1999 | Gudmundson et al. | |
| 5,920,718 A * | 7/1999 | Uczekaj et al. | 717/109 |
| 5,956,513 A | 9/1999 | McLain, Jr. | |
| 6,023,579 A * | 2/2000 | Hellgren et al. | 717/108 |
| 6,059,838 A * | 5/2000 | Fraley et al. | 717/108 |
| 6,085,198 A | 7/2000 | Skinner et al. | |
| 6,112,024 A | 8/2000 | Almond et al. | |
| 6,125,371 A | 9/2000 | Bohannon et al. | |
| 6,158,049 A | 12/2000 | Goodwin et al. | |
| 6,182,160 B1 * | 1/2001 | Burgess | 710/3 |
| 6,195,462 B1 | 2/2001 | Bryniarski et al. | |
| 6,199,195 B1 * | 3/2001 | Goodwin et al. | 717/104 |
| 6,205,465 B1 | 3/2001 | Schoening et al. | |
| 6,226,652 B1 | 5/2001 | Percival et al. | |
| 6,226,788 B1 | 5/2001 | Schoening et al. | |
| 6,230,159 B1 * | 5/2001 | Golde | 707/103 R |
| 6,230,312 B1 * | 5/2001 | Hunt | 717/108 |
| 6,230,314 B1 * | 5/2001 | Sweeney et al. | 717/108 |
| 6,269,473 B1 | 7/2001 | Freed et al. | |
| 6,282,712 B1 | 8/2001 | Davis et al. | |

(Continued)

OTHER PUBLICATIONS

Lee et al, "A reengineering process for migrating from an object oriented legacy system to a component based system", IEEE COMPSAC, pp. 1-6, 2003.*

(Continued)

*Primary Examiner* — Ted T Vo

(74) *Attorney, Agent, or Firm* — Woodcock Washburn LLP

(57) ABSTRACT

A system and methods are provided for implementing an explicit interface member in connection with a computer programming language. Thus, a mechanism is provided that prevents conflicts between independently developed interfaces, enables privately implemented interface members and enables specific versions of generic interfaces that are free from conflict.

36 Claims, 18 Drawing Sheets

```
class C: Interface1
{
    void Interface1.F() {
        Console.WriteLine("Impl of Interface1.F()");
    }
    void Interface1.G() {
        Console.WriteLine("Impl of Interface1.G()");
    }
    public void DoIt() {
        Console.WriteLine("C.DoIt");
    }
}
class Test
{
    static void Main() {
        C c = new C();
        c.DoIt();
        Interface1 i1 = c;
        i1.F();
    }
}
```
— 900

U.S. PATENT DOCUMENTS

| | | | |
|---|---|---|---|
| 6,314,434 B1 | 11/2001 | Shigemi et al. | |
| 6,317,754 B1 | 11/2001 | Peng | |
| 6,385,767 B1 | 5/2002 | Ziebell | |
| 6,442,460 B1 | 8/2002 | Larson et al. | |
| 6,442,748 B1 | 8/2002 | Bowman-Amuah | |
| 6,442,754 B1 | 8/2002 | Curtis | |
| 6,601,234 B1 | 7/2003 | Bowman-Amuah | |
| 6,622,302 B1 | 9/2003 | Delaney et al. | |
| 6,625,804 B1 | 9/2003 | Ringseth et al. | |
| 6,629,316 B1 | 9/2003 | Curtis | |
| 6,658,659 B2 | 12/2003 | Hiller et al. | |
| 6,684,395 B2 | 1/2004 | Johnson et al. | |
| 6,698,015 B1 | 2/2004 | Moberg et al. | |
| 6,701,513 B1* | 3/2004 | Bailey | 717/109 |
| 6,721,942 B1* | 4/2004 | Sievert | 717/137 |
| 6,721,952 B1 | 4/2004 | Guedalia et al. | |
| 6,769,124 B1 | 7/2004 | Schoening et al. | |
| 6,772,160 B2 | 8/2004 | Cho et al. | |
| 6,826,750 B1 | 11/2004 | Curtis et al. | |
| 6,886,155 B2* | 4/2005 | Hasha | 717/116 |
| 6,901,588 B1 | 5/2005 | Krapf et al. | |
| 6,968,538 B2* | 11/2005 | Rust et al. | 717/108 |
| 6,968,540 B2* | 11/2005 | Beck et al. | 717/130 |
| 6,978,281 B1 | 12/2005 | Kruy et al. | |
| 6,981,250 B1* | 12/2005 | Wiltamuth et al. | 717/170 |
| 6,986,132 B1 | 1/2006 | Schwabe | |
| 6,993,759 B2* | 1/2006 | Aptus et al. | 717/170 |
| 7,055,130 B2* | 5/2006 | Charisius et al. | 717/108 |
| 7,055,131 B2* | 5/2006 | Charisius et al. | 717/109 |
| 7,103,873 B2* | 9/2006 | Tanner et al. | 717/109 |
| 7,131,112 B1 | 10/2006 | Bartz et al. | |
| 7,171,646 B2* | 1/2007 | Charisius et al. | 717/100 |
| 7,181,731 B2 | 2/2007 | Pace et al. | |
| 7,210,132 B2* | 4/2007 | Rivard et al. | 717/138 |
| 7,225,426 B2* | 5/2007 | Frank et al. | 717/108 |
| 7,322,024 B2 | 1/2008 | Carlson et al. | |
| 7,610,316 B2 | 10/2009 | Bartz et al. | |
| 7,634,772 B2 | 12/2009 | Parthasarathy et al. | |
| 7,657,887 B2 | 2/2010 | Kothandaraman et al. | |
| 7,873,958 B2 | 1/2011 | Wiltamuth et al. | |
| 2002/0073409 A1 | 6/2002 | Lundback et al. | |
| 2002/0147857 A1 | 10/2002 | Sanchez, II et al. | |
| 2003/0023957 A1 | 1/2003 | Bau, III et al. | |
| 2003/0037328 A1 | 2/2003 | Cicciarelli et al. | |
| 2003/0046282 A1 | 3/2003 | Carlson et al. | |
| 2003/0159135 A1 | 8/2003 | Hiller et al. | |
| 2005/0154550 A1 | 7/2005 | Singh et al. | |

OTHER PUBLICATIONS

Hsiung et al, "Formal verification of embedded real time software in component based appliation frameworks", IEEE, pp. 71-78, 2001.*

Chung et al, "Modeling web applications using Java and XML related technologies" IEEE HICSS, pp. 1-10, 2002.*

Pendharkar et al, "An emparical study of factors impacting the size of object oriented component code documentation", ACM SIGDOC, pp. 152-156, 2002.*

Keller et al, Design components: Towards software composition at the design level, IEEE, pp. 302-311, 1998.*

Dandashi, "A method for assessing the resuability of object oriented cod eusing a validated set of automated measurements", ACM SAC pp. 997-1003, 2002.*

Pandey et al, "BOTS; A constraints based component system for synthesizing scalable software systems", ACM LCTES, pp. 189-198, 2006.*

ECMA, "Draft C# Language Specification", Mar. 2001, Hewlett-Packard, Intel, Microsoft, pp. i-xiv, 1-381.*

Kramer et al., "Configuring Object-based Distributed Programs in REX", Mar. 1992, Software Engineering Journal, pp. 139-149.*

Joseph Bergin, "Multiple Inheritance in Java", Jun. 2000, http://csis.pace.edu/~bergin/patterns/multipleinheritance.html and http://web.archive.org/web/20000816190515/http://www.csis.pace.edu/~bergin/patterns/multipleinheritance.html, 4 pages.*

Alex Shindich, "A few words about Python interfaces", Apr. 2001, an article posted in ActiveState Community, python-list Archieves, http://code.activestate.com/lists/python-list/212738/, 4 pages.*

Paul Prescod, "Python Interface Declaration Language", copyright 1998, W3C, retrieved from http://www.prescod.net/pytypes, 13 pages.*

Bjarne Stroustrup, "Multiple Inheritance for C++", May 1999, THe C/C++ Users Journal, pp. 1-17.*

Appelbaum, M. et al., "AGILE—A CAD/CAM/CAE Interface Language", *SME Technical Paper*, 1984, 1-19.

Eisenberg, M., "Programmable applications: exploring the potential for language/interface symbiosis", *Behaviour & Information Technology*, 1995, 14(1), 56-66.

Goddard, N.J., "Using the "C" programming language for interface control", *Laboratory Microcomputer*, Autumn 1982, 15-22.

Lethaby, N. et al., "Multitasking with C++", *Proceedings of the Fifth Annual Embedded Systems Conference*, Oct. 5-8, 1993, Santa Clara, CA, 103-120.

Morrison, I.W. et al., "The design and prototype implementation of a "structure attribute" model for tool interfacing within an IPSE", *Microarchitectures, Developments and Applications—twelfth EUROMICRO symposium on microprocessing and microprogramming*, Sep. 15-18, 1986, Venice,18, 233-240.

Surveyer, J., "C+=(C-Sharp==Microsoft Java++)? True:False;", *Java Report*, Oct. 2000, 5 pages.

"Defining custom attribute types", Developer Connection, http://developer.apple.com/documentation/QuickTime/QD3D/qd3dattributes.8.—htm, accessed 1997, 3 pages.

"Java Core Reflection", http://web.archive.org/web/20000706224859/http://java.sun.com/j2se/1.3/do-cs/guide/reflection/spec/java-reflection.doc.html, accessed Jul. 6, 2000, 1-7.

"Novell Announces Industry-First Implementation of Draft Java Naming and Directory Interface API", Apr. 1, 1997, 1-2.

Ahmed et al., "Version management of composite objects in CAD databases", ACM SIGMOD, Jun. 1991, 20(2), 218-227.

Albahari et al., "C# essentials", 1.sup.st Ed., Safari Tech Books Online, Feb. 2001, 25 pages.

Amano et al., "LEAD: A Language for Dynamically Adaptable Applications", IEICE Trans. Fundamentals, 1998, E81-A(6), 992-1000.

Bendix et al., "CoEd—A Tool for Versioning of Hierarchical Documents", System Configuration Management, Boris Magnusson (Ed.), ECOOP '98 SCM-8 Symposium, Brussels, Belgium, Springer, Jul. 20-21, 1998, 173-187.

Biglari-Abhari et al., "Improving binary compatibility in VL1W machines through compiler assisted dynamic rescheduling", IEEE, 2000, 386-393.

Bratsberg, "Unified class evolution by object-oriented views", ER '92 Proceedings of the 11th International Conference on the Entity-Relationship Approach: Entity-Relationship Approach, Oct. 7-9, 1992, 423-439.

Bunnell, K., "Extending the NDS Schema Object Class and Attribute Definitions", Nov. 1, 1997, 1-16.

Chen et al., "An inheritance flow model for class hierarchy analysis", Information Processing Letters, Jun. 30, 1998, 66(6), 309-315.

Clamen, "Schema Evolution and Integration", Distributed and Parallel Databases—Special issue on distributed/parallel database object management, Jan. 1994, 2(1), 101-125.

Cohen et al., "Version management in gypsy", ACM SIGSOFT Software Engineering Notes—Special issue: Proceedings of the ACM SIGSOFT/SIGPLAN software engineering symposium on practical software development environments, Nov. 1988, 13(5), 201-215.

Computer Dictionary, 3.sup.rd Ed., Microsoft Press, 1997, 3 pages.

Conradi et al., "Change-oriented versioning: Rationale and evaluation", Software Engineering and Its Applications—Proceedings: Third International Workshop, Dec. 3-7, 1990, 1, 97-109.

Conradi et al., "Version Models for Software Configuration Management", ACM Computing Surveys, Jun. 1998, 30(2), 232-282.

Cooper et al., "Persistent languages facilitate the implementation of software version management", IEEE, Aug. 6, 2002.

Dattolo et al., "Analytical version control management in a hypertext system", ACM, 1994, 132-139.

De Castro et al., "Schema Versioning for Multitemporal Relational Databases", Information Systems, Jul. 1997, 22(5), 249-290.

Drossopoulou et al., "A Fragment Calculus ? Towards a Model of Separate Compilation, Linking and Binary Compatibility", 14th Annual IEEE Symposium on Logic in Computer Science (LICS'99), Trento, Italy, Jul. 2-5, 1999, 147-156.

Flanagan, "JAVA in a nutshell", Second Edition, O'Reilly, May 1997, 15 pages.

Franconi et al., "A Semantic Approach for Schema Evolution and Versioning in Object-Oriented Databases", CL '00 Proceedings of the First International Conference on Computational Logic, Jul. 24-28, 2000, 1048-1062.

Gal et al., "A Multiagent Update Process in a Database with Temporal Data Dependencies and Schema Versioning", IEEE Transactions on Knowledge and Data Engineering, Jan./Feb. 1998, 10(1), 21-37.

Giumale, "Extensible Programming Systems—a way of Achieving Program Representativeness", Buletinul Institutului Politehnic Gheorghe Gheorghiu-Dej Bucuresti, Seria Electrotehnica, 1978, 40(4), 83-91.

Gold, "Creating and Using Custom Attributes in C#", http://www.c-sharpcorner.com/1/CustomeAtrribute.asp, Feb. 27, 2000, 1-4.

Goldstein et al, "The Object Binary Interface—C++ Objects for Evolvable Shared Class Libraries", Proceedings of the 1994 Usenix C++ Conference, Cambridge, MA, Apr. 11-14, 1994, 1-19.

Iannella, "Metadata Repositories Using PICS", Research and Advanced Technology for Digital Libraries, First European Conference, ECDL '97, Pisa, Italy, Sep. 1-3, 1997, 87-98.

Lewine, "Certifying Binary Applications", Proceedings of the Spring 1992 EurOpera & USENIX Workshop, Jersey, Channel Islands, Apr. 6-9, 1992, 25-32.

Lewis, "Logic programming to facilitate understanding of Z specifications," Software Engineering in Higher Education, First International Conference on Software Engineering in Higher Education, Nov. 23-25, 1994; 431-438.

Microsoft Press, "Computer Dictionary", Third Edition, 1997, pp. 91, 410.

Mishchenko, "Properties of Extensible Programming Systems in the Proekt System", Kibernetika, 1975, 11(2), 91-94.

Oiwa et al., "Extending Java Virtual Machine with Integer-Reference Conversion", Concurrency: Practice and Experience, May 2000, 12(6), 407-22.

Oussalah et al., "Complex Object Versioning", CAiSE '97 Proceedings of the 9th International Conference on Advanced Information Systems Engineering, Jun. 16-20, 1997, 259-272.

Proper, "Data schema design as a schema evolution process", Data & Knowledge Engineering, Apr. 1997, 22(2), 159-189.

Roddick, "A Survey of schema versioning issues for database systems", Information and Software Technology, Jan. 1, 1995, 37(7), 383-393.

Rose et al., "Schema versioning in a temporal object-oriented data model", International Journal on Artificial Intelligence Tools, 1998, 7(3), 293-318.

Sachweh et al., "Version Management for tightly integrated software engineering environments", Proceedings on Software Engineering Environments [Conference], Apr. 5-7, 1995, 21-31.

Tsotras et al., "Optimal Versioning of Objects", Eighth International Conference on Data Engineering, Feb. 2-3, 1992, 358-365.

Urtado et al., "Complex Entity Versioning at Two Granularity Levels", Information Systems, May-Jun. 1998, 23(3-4), 197-216.

Wein et al., "Visual support for version management", SAC '92 Proceedings of the 1992 ACM/SIGAPP symposium on Applied computing: technological challenges of the 1990's, 1992, 1217-1223.

Westfechtel et al., "A layered architecture for uniform version management", Transactions on Software Engineering, IEEE, Aug. 7, 2002.

Wieczerzycki, "Advanced versioning mechanisms supporting CSCW environments", Journal of Systems Architecture, Mar. 1997, 43(1-5), 215-227.

Zachmann, "The six key technologies for the future", Industry, 1981, 15-17.

* cited by examiner

FIG. 3A

```
using System;
interface Interface1
{
        void F();
}
class C: Interface1
{
        public void F() {
                Console.WriteLine("C.F(), which implements Interface1.F()");
        }
}
class Test
{
        static void Main() {
                C c = new C();

// Call through the class
                c.F();
                // Call through the interface
                Interface1 i_c = c;
                i_c.F();
        }
}
```

FIG. 3B ⸺ 310

```
class C: Interface1
{
        void Interface1.F() {
                Console.WriteLine("C's implementaion of Interface1.F()");
        }
}
class Test
{
        static void Main() {
                C c = new C();

// Can't call c.F() through the class, but
                // can still call through the interface
                Interface1 i_c = c;
                i_c.F();
        }
}
```

```
interface ICloneable
{
        object Clone();
}
interface IComparable
{
        int CompareTo(object other);
}
class ListEntry: ICloneable, IComparable
{
        object ICloneable.Clone() {...}
        int IComparable.CompareTo(object other) {...}
}
```

```
class Shape: ICloneable
{
        object ICloneable.Clone() {...}
        int IComparable.CompareTo(object other) {...}
}
```

```
class Shape: ICloneable
{
        object ICloneable.Clone() {...}
}
class Ellipse: Shape
{
        object ICloneable.Clone() {...}
}
```

FIG. 4D

```
interface IControl
{
        void Paint();
}
interface ITextBox: IControl
{
        void SetText(string text);
}
class TextBox: ITextBox
{
        void IControl.Paint() {...}
        void ITextBox.SetText(string text) {...}
}
```

FIG. 5A

```
interface ICloneable
{
        object Clone();
}
class C: ICloneable
{
        object ICloneable.Clone() {...}
        public object Clone() {...}
}
```
— 500

FIG. 5B

```
interface IControl
{
        void Paint();
}
interface IForm
{
        void Paint();
}
class Page: IControl, IForm
{
        public void Paint() {...}
}
```
— 510

```
interface IBase
{
        int P { get; }
}
interface IDerived: IBase
{
        new int P();
}
```
FIG. 5C
— 520

```
class C: IDerived
{
        int IBase.P { get {...} }
        int IDerived.P() {...}
}
class C: IDerived
{
        public int P { get {...} }
        int IDerived.P() {...}
}
class C: IDerived
{
        int IBase.P { get {...} }
        public int P() {...}
}
```
FIG. 5D
— 530

```
interface IControl
{
        void Paint();
}
interface ITextBox: IControl
{
        void SetText(string text);
}
interface IListBox: IControl
{
        void SetItems(string[] items);
}
class ComboBox: IControl, ITextBox,
IListBox
{
        void IControl.Paint() {...}
        void ITextBox.SetText(string text) {...}
        void IListBox.SetItems(string[] items)
{...}
}
```

```
interface Interface1
{
        void F();
}
class Class1
{
        public void F() {}
        public void G() {}
}
class Class2: Class1, Interface1
{
        new public void G() {}
}
```

```
interface IControl
{
        void Paint();
}
class Control: IControl
{
        public void Paint() {...}
}
class TextBox: Control
{
        new public void Paint() {...}
}
```

```
Control c = new Control();
TextBox t = new TextBox();
IControl ic = c;
IControl it = t;
c.Paint();        // invokes Control.Paint();
t.Paint();        // invokes TextBox.Paint();
ic.Paint();       // invokes Control.Paint();
it.Paint();       // invokes Control.Paint();
```

```
interface IControl
{
        void Paint();
}
class Control: IControl
{
        public virtual void Paint() {...}
}
class TextBox: Control
{
        public override void Paint() {...}
}
```
— 620

FIG. 6C

```
Control c = new Control();
TextBox t = new TextBox();
IControl ic = c;
IControl it = t;
c.Paint();          // invokes Control.Paint();
t.Paint();          // invokes TextBox.Paint();
ic.Paint();         // invokes Control.Paint();
it.Paint();         // invokes TextBox.Paint();
```
— 630

FIG. 6D

```
interface IControl
{
        void Paint();
}
class Control: IControl
{
        void IControl.Paint() { PaintControl(); }
        protected virtual void PaintControl() {...}
}
class TextBox: Control
{
        protected override void PaintControl() {...}
}
```
— 640

FIG. 6E

```
interface IControl
{
        void Paint();
}
class Control: IControl
{
        void IControl.Paint() {...}
}
class MyControl: Control, IControl
{
        public void Paint() {}
}
```

```
interface IMethods
{
        void F();
        void G();
        void H();
        void I();
}
class Base: IMethods
{
        void IMethods.F() {}
        void IMethods.G() {}
        public void H() {}
        public void I() {}
}
class Derived: Base, IMethods
{
        public void F() {}
        void IMethods.H() {}
}
```

```
interface IBase
{
        void F();
}
interface IDerived: IBase
{
        void G();
}
class C: IDerived
{
        void IBase.F() {...}
        void IDerived.G() {...}
}
class D: C, IDerived
{
        public void F() {...}
        public void G() {...}
}
```
⎯ 720

FIG. 8A ⟵ 800

```
interface Interface1
{
        void F();
        void G();
}
```

FIG. 8B ⟵ 810

```
interface Interface2
{
        void F();
        void H();
}
```

FIG. 8C ⟵ 820

```
using System;
class C: Interface1, Interface2
{
        public void F() {
                Console.WriteLine("Impl of Interface1.F(), Interface2.F()");
        }
        public void G() {
                Console.WriteLine("Impl of Interface1.G()");
        }
        public void H() {
                Console.WriteLine("Impl of Interface2.H()");
        }
}
class Test {
        static void Main() {
                C c = new C();
                c.F();
                Interface1 i1 = c;
                Interface2 i2 = c;
                i1.F();
                i2.F();
        }
}
```

FIG. 8D

```
interface Interface1 {
        void F();
        void G();
}
interface Interface2 {
        int F();
        void H();
}
```
— 830

FIG. 8E
— 840

```
using System;
class C: Interface1, Interface2
{
        public void F() {
                Console.WriteLine("Impl of Interface1.F()");
        }
        public int F() {
                Console.WriteLine("Impl of Interface2.F()");
                return 123;
        }
        public void G() {
                Console.WriteLine("Impl of Interface1.G()");
        }
        public void H() {
                Console.WriteLine("Impl of Interface2.H()");
        }
}
```

FIG. 8F

```
using System;
class C: Interface1, Interface2
{
        void Interface1.F() {
                Console.WriteLine("Impl of Interface1.F()");
        }
        int Interface2.F() {
                Console.WriteLine("Impl of Interface2.F()");
                return 123;
        }
        public void G() {
                Console.WriteLine("Impl of Interface1.G()");
        }
        public void H() {
                Console.WriteLine("Impl of Interface2.H()");
        }
}
class Test
{
        static void Main() {
                C c = new C();
                Interface1 i1 = c;
                Interface2 i2 = c;
                i1.F();
                int ans = i2.F();
        }
}
```

FIG. 9

```
class C: Interface1
{
        void Interface1.F() {
                Console.WriteLine("Impl of Interface1.F()");
        }
        void Interface1.G() {
                Console.WriteLine("Impl of Interface1.G()");
        }
        public void DoIt() {
                Console.WriteLine("C.DoIt");
        }
}
class Test
{
        static void Main() {
                C c = new C();
                c.DoIt();
                Interface1 i1 = c;
                i1.F();
        }
}
```

```
interface IEnumerator
{
        public bool MoveNext();
        public void Reset();
        public object Current { get; }
}
```

```
class Item
{...}
class ItemCollection: IEnumerator
{
        // IEnumerator members
        bool MoveNext() {...}
        void Reset() {...}
        object Current { get {...} }
        // Introduced members
        void Add(Item item) {...}
        void Remove(Item item) {...}
}
```

```
class ItemCollection: IEnumerator
{
        // IEnumerator members
        public bool MoveNext() {...}
        public void Reset() {...}
        object IEnumerator.Current {
                get {
                        return this.Current;
                }
        }
        // Introduced members
        public void Add(Item item) {...}
        public Item Current { get {...} }
        public void Remove(Item item) {...}
}
```

SYSTEM AND METHODS FOR IMPLEMENTING AN EXPLICIT INTERFACE MEMBER IN A COMPUTER PROGRAMMING LANGUAGE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2000, Microsoft Corp.

CROSS REFERENCE TO RELATED APPLICATIONS

This application relates to U.S. patent application Ser. Nos. 09/900,113 and 09/900,111 filed Jul. 5, 2001.

FIELD OF THE INVENTION

The present invention relates to the provision of an explicit interface member in connection with a computer programming language.

BACKGROUND OF THE INVENTION

In computing terms, a program is a specific set of ordered operations for a computer to perform. With an elementary form of programming language known as machine language, a programmer familiar with machine language can peek and poke data into and out from computer memory, and perform other simple mathematical transformations on data. Over time, however, the desired range of functionality of computer programs has increased quite significantly making programming in machine language generally cumbersome. As a result, proxy programming languages capable of being compiled into machine language and capable of much higher levels of logic have evolved. Examples of such evolving languages include COBOL®, Fortran®, Basic®, Pascal®, C®, C++®, Lisp®, Visual Basic®, C#® and many others. Some programming languages tend to be better than others at performing some types of tasks, but in general, the later in time the programming language was introduced, the more complex functionality that the programming language possesses empowering the developer more and more over time. Additionally, class libraries containing methods, classes and types for certain tasks are available so that, for example, a developer coding mathematical equations need not derive and implement the sine function from scratch, but need merely include and refer to the mathematical library containing the sine function.

Further increasing the need for evolved software in today's computing environments is that software is being transported from computing device to computing device and across platforms more and more. Thus, developers are becoming interested in aspects of the software beyond bare bones standalone personal computer (PC) functionality. To further illustrate how programming languages continue to evolve, in one of the first descriptions of a computer program by John von Neumann in 1945, a program was defined as a one-at-a-time sequence of instructions that the computer follows. Typically, the program is put into a storage area accessible to the computer. The computer gets one instruction and performs it and then gets the next instruction. The storage area or memory can also contain the data on which the instruction operates. A program is also a special kind of "data" that tells how to operate on application or user data. While not incorrect for certain simple programs, the view is one based on the simplistic world of standalone computing and one focused on the functionality of the software program.

However, since that time, with the advent of parallel processing, complex computer programming languages, transmission of programs and data across networks, and cross platform computing, the techniques have grown to be considerably more complex, and capable of much more than the simple standalone instruction by instruction model once known.

For more general background, programs can be characterized as interactive or batch in terms of what drives them and how continuously they run. An interactive program receives data from an interactive user or possibly from another program that simulates an interactive user. A batch program runs and does its work, and then stops. Batch programs can be started by interactive users who request their interactive program to run the batch program. A command interpreter or a Web browser is an example of an interactive program. A program that computes and prints out a company payroll is an example of a batch program. Print jobs are also batch programs.

When one creates a program, one writes it using some kind of computer language and the collection(s) of language statements are the source program(s). One then compiles the source program, along with any utilized libraries, with a special program called a language compiler, and the result is called an object program (not to be confused with object-oriented programming). There are several synonyms for an object program, including object module, executable program and compiled program. The object program contains the string of 0s and called machine language with which the logic processor works. The machine language of the computer is constructed by the language compiler with an understanding of the computer's logic architecture, including the set of possible computer instructions and the bit length of an instruction.

Other source programs, such as dynamic link libraries (DLL) are collections of small programs, any of which can be called when needed by a larger program that is running in the computer. The small program that lets the larger program communicate with a specific device such as a printer or scanner is often packaged as a DLL program (usually referred to as a DLL file). DLL files that support specific device operation are known as device drivers. DLL files are an example of files that may be compiled at run-time.

The advantage of DLL files is that, because they don't get loaded into random access memory (RAM) together with the main program, space is saved in RAM. When and if a DLL file is needed, then it is loaded and executed. For example, as long as a user of Microsoft Word® is editing a document, the printer DLL file does not need to be loaded into RAM. If the user decides to print the document, then the Word application causes the printer DLL file to be loaded into the execution space for execution.

A DLL file is often given a ".dll" file name suffix. DLL files are dynamically linked with the program that uses them during program execution rather than being compiled with the main program. The set of such files (or the DLL) is somewhat comparable to the library routines provided with programming languages such as Fortran®, Basic®, Pascal®, C®, C++®, C#®, etc.

The above background illustrates (1) that computer programming needs can change quickly in a very short time along with the changing computing environments in which they are intended to operate and (2) that computing programming environments are considerably more complex than they once were. As computing environments become more and more complex, there is generally a greater need for uniformity of functionality across platforms, uniformity among programming language editors, uniformity among programming language compilers and run time aspects of programming. In short, as today's computer system architectures have quickly expanded to the limits of the Earth via global networks, the types of programming tasks that are possible and desirable has also expanded to new limits. For example, since a program may traverse hundreds, if not hundreds of thousands of computers, as a result of copying, downloading or other transmission of the source code, developed by a plurality of unknown developers, affiliated with one another or not, there are a number of scenarios in which implementing an explicit interface member has become desirable.

While many object oriented programming languages allow for implementation of an interface, thus far, no programming language has presented an explicit interface member that is adequate for today's distributed computing environments in which, inter alia, maximum control may not be available for exercising over end user client bits. With today's programming languages, typically, a class or struct implements an interface member by providing a public instance member with the same signature. However, first, there is generally no way to control the independent development of interfaces that may ultimately conflict. Second, current programming languages allow only the implementation of public members, and thus do not allow the implementation of private interfaces, which enable greater developing flexibility. Public interfaces, for example, may ultimately place additional unintended overhead on a class definition that implements the interface. Third, present programming languages do not enable a developer to implement specific versions of a generic interface without potential conflict.

Thus, there is a need for a robust system and methods for implementing an explicit interface member in connection with a computer programming language. It would be desirable to provide a mechanism that prevents conflicts between independently developed interfaces. It would be further desirable to provide a mechanism for implementing private interface members. It would be still further desirable to provide a mechanism for implementing specific versions of generic interfaces that do not conflict.

SUMMARY OF THE INVENTION

In view of the foregoing, the present invention provides a system and methods for implementing an explicit interface member in connection with a computer programming language. Thus, a mechanism is provided that prevents conflicts between independently developed interfaces, enables privately implemented interface members and enables specific versions of generic interfaces that are free from conflict.

Other features of the present invention are described below.

BRIEF DESCRIPTION OF THE DRAWINGS

The system and methods for providing an explicit interface member in connection with a programming language are further described with reference to the accompanying drawings in which:

FIGS. 3A and 3B show computer programming language pseudocode illustrating an overview of the explicit interface member implementation of the present invention;

FIGS. 4A through 4D show computer programming language pseudocode illustrating various syntactical and other definitional aspects of explicit interface member implementations in accordance with the present invention;

FIGS. 5A through 5F show computer programming language pseudocode illustrating various aspects of and exemplary rules for interface mapping in connection with explicit interface member implementations in accordance with the present invention;

FIGS. 6A through 6E show computer programming language pseudocode illustrating interface implementation inheritance in connection with explicit interface member implementations in accordance with the present invention;

FIGS. 7A through 7C show computer programming language pseudocode illustrating interface re-implementation in connection with explicit interface member implementations in accordance with the present invention;

FIGS. 8A through 8F show computer programming language pseudocode illustrating the problem of implementing two independently-developed and conflicting interfaces and the solution thereof in accordance with explicit interface member implementations of the present invention;

FIG. 9 shows computer programming language pseudocode illustrating the problem of public only interfaces and the solution thereof in accordance with explicit interface member implementations of the present invention; and FIGS. 10A through 10C show computer programming language pseudocode illustrating the problem of conflicting specific implementations of a generic interface and the solution thereof in accordance with explicit interface member implementations of the present invention.

DETAILED DESCRIPTION OF THE INVENTION

Overview of the Invention

The present invention provides a system and methods for providing explicit interface member in connection with computer programming languages. Thus, in accordance with the present invention, a mechanism is provided that prevents conflicts between independently developed interfaces. The invention further enables privately implemented interface members, as well as public implementations. The invention also enables specific implementations of generic interfaces that do not conflict.

As mentioned in the background, some support for interfaces is common in object-oriented programming languages today. Typically, a class or struct implements an interface member by providing a public instance member with the same signature. For instance, the program code 300 of FIG. 3A defines an interface Interface1 containing a method F and a class C that implements the interface by including a public instance method F. However, as described in the background, such support for public interfaces alone is limited.

C#® supports the above model, but in accordance with the present invention additionally supports an innovative language feature in this area, namely explicit interface member implementation. Explicit interface member implementation permits a class or struct to implement one or more interface members by explicitly specifying the relationship between the class or struct member and the interface member. This association is made by specifying the name of the class or struct member as a qualified name, consisting of the interface name and the interface member name.

For instance, the program code 310 of FIG. 3B includes a class C that implements the interface Interface1 with the method Interface1.F. The member Interface1.F is an example of an explicit interface member implementation, described in greater detail below.

Exemplary Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 1:
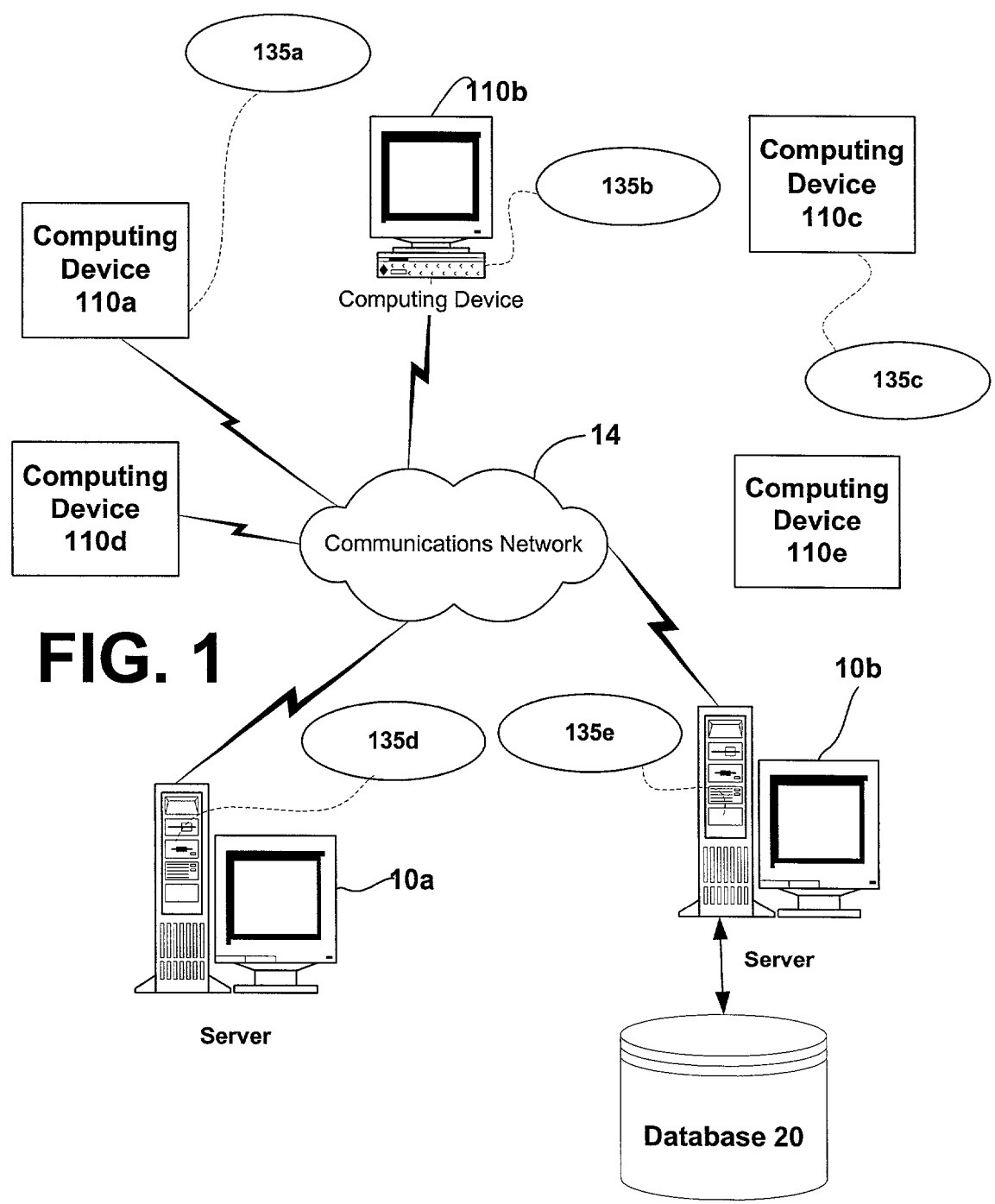
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to perform programming services, with interfacing functionality. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 or other storage element in accordance with the present invention, such as a database 20 for storing software having the interfacing of the present invention. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Exemplary Computing Device

Figure 2:
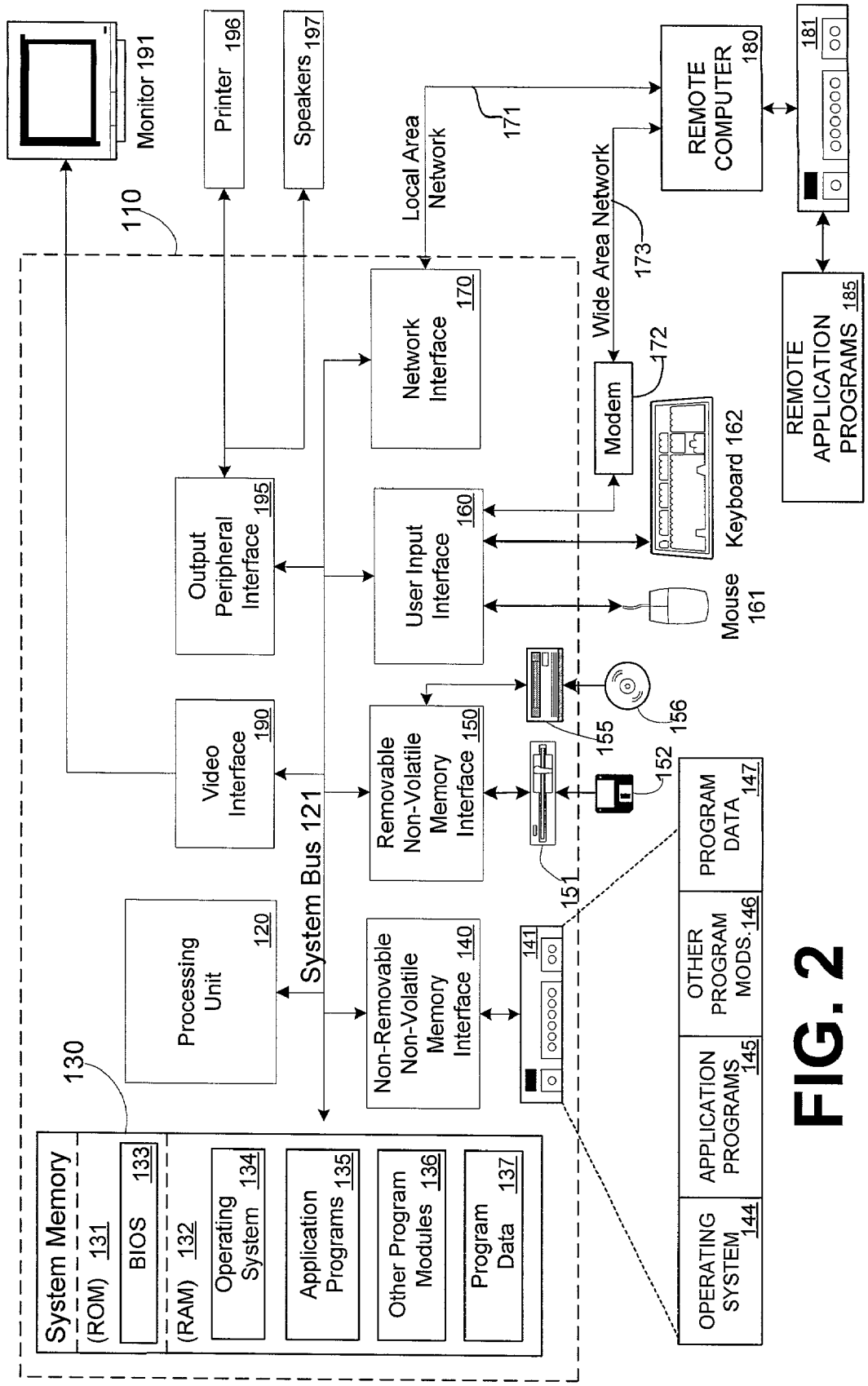
FIG. 2 is a block diagram representing an exemplary non-limiting computing device that may be present in an exemplary network environment, such as described in FIG. 1.

FIG. 2 and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example, and such a computing device may include a browser for connecting to a network, such as the Internet. Additionally, the present invention may be implemented in an environment of networked hosted services in which very little or minimal client resources are implicated, e.g., a networked environment in which the client device serves merely as a browser or interface to the World Wide Web.

Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Software may be designed using many different methods, including object-oriented programming methods. C++®, Java®, etc. are examples of common object-oriented programming languages that provide functionality associated with object-oriented programming. Object-oriented programming methods provide a means to encapsulate data members, e.g. variables, and member functions, e.g. methods, that operate on that data into single entity called a class. Object-oriented programming methods also provide means to create new classes based on existing classes.

An object is an instance of a class. The data members of an object are attributes that are stored inside the computer memory, and the methods are executable computer code that act upon this data, along with potentially providing other services. The present invention provides a robust system and techniques for explicitly implementing interfaces for classes and methods.

In exemplary embodiments of the explicit interface mechanism as described herein, the present invention is described in connection with the C#® programming language. However, one of ordinary skill in the art will readily recognize that the interfacing techniques of the present invention may be implemented with any programming language, such as Fortran®, Pascal®, Visual Basic®, C®, C++®, Java®, etc.

C#® is a simple, modern, object oriented, and type-safe programming language derived from C® and C++®. C#®, pronounced "C sharp" like the musical note, is firmly planted in the C® and C++® family tree of languages, and will be familiar to programmers having an understanding of the C® and C++® programming languages, and other object-oriented programming languages. Generally, C#® combines the high productivity of Visual Basic® and the raw power of C++®, and provides many unique programming features as well.

C#® is provided as part of Microsoft Visual Studio® 7.0. In addition to C#®, Visual Studio® supports Visual Basic®, Visual C++®, and the scripting languages VBScript® and JScript®. All of these languages provide access to the Microsoft .NET® platform, which includes a common execution engine and a rich class library. The Microsoft .NET® platform defines a Common Language Subset (CLS), a sort of lingua franca that ensures seamless interoperability between CLS-compliant languages and class libraries. For C#® developers, this means that even though C#® is a new language, it has complete access to the same rich class libraries that are used by seasoned tools such as Visual Basic® and Visual C++®. C#® itself may not include a class library.

.Net® is a computing framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net® platform includes servers, building-block services, such as Web-based data storage and downloadable device software.

Generally speaking, the .Net® platform provides (1) the ability to make the entire range of computing devices work together and to have user information automatically updated and synchronized on all of them, (2) increased interactive capability for Web sites, enabled by greater use of XML (Extensible Markup Language) rather than HTML, (3) online services that feature customized access and delivery of products and services to the user from a central starting point for the management of various applications, such as e-mail, for example, or software, such as Office Net®, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with C#®, the interfacing of the present invention may be supported in all of Microsoft's .NET® languages. Thus, as one of ordinary skill in the art can appreciate, it would be desirable to incorporate the interfacing functionality of the present invention into any programming language.

Explicit Interface Member Implementation

The present invention provides an explicit interface member implementation in connection with a programming language, such as C#®. The explicit interface member implementation of the present invention permits a class or struct to implement one or more interface members by explicitly specifying the relationship between the class or struct member and the interface member. Explicit interface member implementation is a language feature that differentiates a programming language, such as C#®, from all other known computer programming platforms and languages. Any language that includes interface implementation could potentially benefit by adding a feature similar to the below-described explicit interface member implementation in C#®.

Explicit interface member implementations

Thus, for purposes of implementing interfaces in accordance with the present invention, a class or struct may declare explicit interface member implementations. An explicit interface member implementation is a method, property, event, or indexer declaration that references a fully qualified interface member name. For example, in the code 400 of FIG. 4A, illustrating an exemplary explicit interface member implementation, ICloneable.Clone and IComparable.CompareTo are explicit interface member implementations.

It is not possible to access an explicit interface member implementation through its fully qualified name in a method invocation, property access, or indexer access. An explicit interface member implementation can only be accessed through an interface instance, and is in that case referenced simply by its member name. It is also an error for an explicit interface member implementation to include access modifiers, just as it is an error to include the abstract, virtual, override, or static modifiers.

Explicit interface member implementations have different accessibility characteristics than other members. Because explicit interface member implementations are not accessible through their fully qualified name in a method invocation or a property access, they are in a sense private. However, since they can be accessed through an interface instance, they are in a sense also public.

Explicit interface member implementations serve at least two purposes not provided by available prior art provision of interfacing. First, since explicit interface member implementations are not accessible through class or struct instances, they allow interface implementations to be excluded from the public interface of a class or struct. This is particularly useful when a class or struct implements an internal interface that is of no interest to a consumer of the class or struct. Second, explicit interface member implementations allow disambiguation of interface members with the same signature. Without explicit interface member implementations it would be impossible for a class or struct to have different implementations of interface members with the same signature and return type, as would it be impossible for a class or struct to have any implementation at all of interface members with the same signature but with different return types.

For an explicit interface member implementation to be valid, the class or struct must name an interface in its base class list that contains a member whose fully qualified name, type, and parameter types exactly match those of the explicit interface member implementation. Thus, in the class Shape illustrated by code 410 of FIG. 4B, the declaration of IComparable.CompareTo is invalid because IComparable is not listed in the base class list of Shape and is not a base interface of ICloneable. Likewise, in the declarations of Shape and Ellipse in code 420 of FIG. 4C, the declaration of ICloneable.Clone in Ellipse is in error because ICloneable is not explicitly listed in the base class list of Ellipse.

The fully qualified name of an interface member references the interface in which the member was declared. Thus, in the declarations of code 430 of FIG. 4D, the explicit interface member implementation of Paint is written as IControl.Paint.

A class or struct provides implementations of all members of the interfaces that are listed in the base class list of the class or struct. The process of locating implementations of interface members in an implementing class or struct is known as interface mapping.

Interface mapping for a class or struct C locates an implementation for each member of each interface specified in the base class list of C. The implementation of a particular interface member I.M, where I is the interface in which the member M is declared, is determined by examining each class or struct S, starting with C. The process repeats for each successive base class of C, until a match is located:

If S contains a declaration of an explicit interface member implementation that matches I and M, then this member is the implementation of I.M.

Otherwise, if S contains a declaration of a non-static public member that matches M, then this member is the implementation of I.M.

An error occurs if implementations cannot be located for all members of all interfaces specified in the base class list of C. For purposes of this process, the members of an interface include those members that are inherited from base interfaces.

For purposes of interface mapping, a class member A matches an interface member B when any on of the following is true: (1) A and B are methods, and the name, type, and formal parameter lists of A and B are identical, (2) A and B are properties, the name and type of A and B are identical, and A has the same accessors as B, wherein A is permitted to have additional accessors if it is not an explicit interface member implementation, (3) A and B are events, and the name and type of A and B are identical and (4) A and B are indexers, the type and formal parameter lists of A and B are identical, and A has the same accessors as B, wherein A is permitted to have additional accessors if it is not an explicit interface member implementation.

There are notable implications of the above interface mapping algorithm(s). First, explicit interface member implementations take precedence over other members in the same class or struct when determining the class or struct member that implements an interface member. Second, private, protected, and static members do not participate in interface mapping.

In exemplary code 500 of FIG. 5A, the ICloneable. Clone member of C becomes the implementation of Clone in IC/oneable because explicit interface member implementations take precedence over other members.

If a class or struct implements two or more interfaces containing a member with the same name, type, and parameter types, it is possible to map each of those interface members onto a single class or struct member. In exemplary code 510 of FIG. 5B, the Paint methods of both IControl and IForm are mapped onto the Paint method in Page. It is also possible to have separate explicit interface member implementations for the two methods.

If a class or struct implements an interface that contains hidden members, then some members must necessarily be implemented through explicit interface member implementations. For instance, an implementation of the interface of exemplary code 520 of FIG. 5C would require at least one explicit interface member implementation, and would take one of the forms illustrated by code 530 of FIG. 5D.

When a class implements multiple interfaces that have the same base interface, there can be only one implementation of the base interface. In exemplary code 540 of FIG. 5E, it is not possible to have separate implementations for the IControl named in the base class list, the IControl inherited by ITextBox, and the IControl inherited by IListBox. Indeed, there is no notion of a separate identity for these interfaces. Rather, the implementations of ITextBox and IListBox share the same implementation of IControl, and ComboBox is simply considered to implement three interfaces, IControl, ITextBox, and IListBox.

As mentioned above, the members of a base class participate in interface mapping. In exemplary code 550 of FIG. 5F, the method F in Class1 is used in Class2's implementation of Interface1.

With respect to interface implementation inheritance in accordance with the present invention, a class inherits all interface implementations provided by its base classes. Without explicitly re-implementing an interface, a derived class cannot in any way alter the interface - mappings it inherits from its base classes. For example, in the declarations of exemplary code 600 of FIG. 6A, the Paint method in TextBox hides the Paint method in Control, but it does not alter the mapping of Control.Paint onto IControl.Paint. Calls to Paint through class instances and interface instances will have the effects illustrated by code 610 of FIG. 6B.

However, when an interface method is mapped onto a virtual method in a class, it is possible for derived classes to override the virtual method and alter the implementation of the interface. For example, rewriting the declarations of FIG. 6A to the declarations of code 620 of FIG. 6C, the effects of code 630 of FIG. 6D are observed.

Since explicit interface member implementations are not declared virtual, it is not possible to override an explicit interface member implementation. It is, however, perfectly valid for an explicit interface member implementation to call another method, and that other method can be declared virtual to allow derived classes to override it. In exemplary code 640 of FIG. 6E, classes derived from Control can specialize the implementation of IControl.Paint by overriding the PaintControl method.

With respect to interface re-implementation in accordance with the present invention, a class that inherits an interface implementation is permitted to re-implement the interface by including it in the base class list. A re-implementation of an interface follows the same interface mapping rules as an initial implementation of an interface. Thus, the inherited interface mapping has no effect on the interface mapping established for the re-implementation of the interface. For example, in the declarations of exemplary code 700 of FIG. 7A, the fact that Control maps IControl.Paint onto Control.IControl.Paint doesn't affect the re-implementation in MyControl, which maps IControl.Paint onto MyControl.Paint.

Inherited public member declarations and inherited explicit interface member declarations participate in the interface mapping process for re-implemented interfaces. In exemplary code 710 of FIG. 7B, the implementation of IMethods in Derived maps the interface methods onto Derived.F, Base.IMethods.G, Derived.IMethods.H and Base.I. When a class implements an interface, it implicitly also implements all of the interface's base interfaces. Likewise, a re-implementation of an interface is also implicitly a re-implementation of all of the interface's base interfaces. In exemplary code 720 of FIG. 7C, the re-implementation of IDerived also re-implements IBase, mapping IBase.F onto D.F.

The invention of explicit interface member implementation provides a solution to a number of shortcoming in the prior art, namely the lack of ability to handle implementation of two independently-developed and conflicting interfaces, the lack of ability to privately implement an interface, and the lack of ability to specifically implement generic explicit interface members.

What follows is a more detailed description of these scenarios in order to understand both the drawbacks of interfaces that lack the benefits of the present invention, and the benefits that an explicit interface member implementation brings to a programming language, such as C#.

Interfacing—Implementing Two Independently-Developed and Conflicting Interfaces

It is common for an interface to be developed by one party and to be implemented by another, and also for one class or struct to implement multiple interfaces. Given the independent nature of this development, conflicts sometimes arise. For instance, it is possible for two interface designers to select the same interface member name. One developer named FirstParty might deliver the interface represented by code 800 of FIG. 8A and another named SecondParty might deliver the interface represented by code 810 of FIG. 8B.

When the (1) signature, which may be based on name, parameter number, parameter types, (2) return value, and (3) contractual semantics of the methods are identical, this typically does not present a problem. C# and some other languages permit a class or struct to implement both interface methods with a single method, such as is illustrated by the code 820 of FIG. 8C. However, given the fact that the interfaces were independently developed, this confluence of factors is extremely unlikely. In a particularly bad scenario, the methods have the same signature, but a different return value, as illustrated by code 830 of FIG. 8D.

In the scenario of FIG. 8D, it is not possible for a single class to implement both interfaces, since overloading based on return type is not permitted. This overloading restriction is common in object-oriented programming languages. The program 840 of FIG. 8E is also illegal. This limitation can present difficulties for developers, who generally are forced to workaround the problem by implementing the two interfaces on different objects. This workaround is possible but inconvenient, makes developing more complex, and generally consumes time and computing resources.

Explicit interface member implementation addresses this scenario in a much better way. The class C can be fixed by implementing either or both of the interface members using explicit interface member implementation. The program 850 of FIG. 8F uses explicit interface member implementation in accordance with the invention for both Interface1.F and Interface2.F.

Interfacing—Privately Implementing an Interface

In other current programming languages, interface members can only be implemented using public members. In certain circumstances, it is convenient for a class to implement an interface, but in a private manner. By doing so, a class can both implement the interface and avoid cluttering up the class definition. This can be an important factor for class library providers because the consumers of class libraries typically look to the public members of a class for information on how to use the class.

For instance, the class C implemented by code 900 of FIG. 9 implements Interface1 using private interface member implementation according to the present invention. A class consumer would look at C with an object browser or other tool and see that C implements the Interface1 interface, and that C provides a G method. Note that the class consumer does not see an F method on C. The omission of this member provides value to the developer of C. The lack of an F helps call attention to the method G, which is what consumers should actually be concerned with. The implementation of Interface1.F can still be called, but it is necessary to cast to Interface1 first.

Interfacing—Generic-Specific Programming

A specific example of privately implementing an interface relates to generic-specific programming, wherein a generic interface or group of interfaces is defined, and one or more implementers provide specific implementations. For instance, implementers might agree on a set of collection interfaces that are based on a generic type like object, as illustrated in code 1000 of FIG. 10A. The implementers might then provide specific implementations for strongly typed collections of various types. Without explicit interface member implementation, as illustrated by the code 1010 of FIG. 10B, it is not possible to provide a strongly typed member named "Current" since this name is already taken by the name of the member that implements Ienumerator. Current.

This lack of a strongly typed member has several negative effects including (1) performance during iteration is slowed down, as an explicit conversion from object to Item is required, (2) developer productivity is negatively impacted because developers typically forget to do the cast, and this leads to a compile-time error and (3) developer productivity is negatively impacted because development tools that are based on strong typing, e.g. statement completion, are hampered in this scenario.

The Item Collection can be fixed by implementing IEnumerator. Current using explicit interface member implementation, thus keeping the generic implementation out of the public interface of ItemCollection and adding a strongly typed public member named Current. Typically, the generic member can simply defer to the strongly typed member, and no conversions are required, as illustrated by code 1020 of FIG. 10C.

As mentioned above, while exemplary embodiments of the present invention have been described in connection with the C#® programming language, the underlying concepts may be applied to any programming language for which it would be desirable to have interfacing as described herein. Thus, an explicit interface member in accordance with the present invention may be implemented with any programming language, such as Fortran®, Pascal®, Visual Basic®, C®, C++®, Java® etc. In accordance with the present invention, a developer may utilize, or code, with a programming feature, namely an explicit interface member mechanism as described above, that enables a software component to implement an explicit interface member by explicitly specifying the relationship between the software component and the interface member.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs utilizing the interfaces of the present invention are preferably implemented in a high level procedural or object oriented programming language to communicate with a computer system. However, the program(s) can be implemented in assembly or machine language, if desired.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to include the interfacing functionality of the present invention. For example, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of programming in a networked or .NET® computing environment, one skilled in the art will recognize that the present invention is not limited thereto, and that the methods of programming in a programming environment having explicitly defined interface members, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A method comprising:
   implementing in a class a first explicit interface having a first explicit interface member by explicitly specifying the relationship between the class and the first explicit interface member, the first explicit interface member being excluded from a public interface of the class;
   implementing in the class a second explicit interface having a second explicit interface member, the second explicit interface member having the same signature as the first explicit interface member, the signature comprising a member name, a number of one or more parameters, and a type for each of the number of one or more parameters;
   after implementing in the class the first and second explicit interfaces, compiling the class into computer-executable instructions along with a call in the class to the first explicit interface member and a call in the class to the second explicit interface member, the call comprising an identifier of an explicit interface, and a corresponding identifier of an explicit interface member;
   in response to processing an instruction of the instructions corresponding to the call to the first explicit interface member, executing the call with the first explicit interface member to produce a first result;
   storing the first result in a computer readable storage medium;
   in response to processing a second instruction of the instructions corresponding to the call to the second explicit interface member, executing the call with the second explicit interface member to produce a second result; and
   storing the second result in the computer readable storage medium.

2. The method according to claim 1, wherein said specifying of the relationship between the class and the first explicit interface member includes;
   specifying a qualified name of the class.

3. The method according to claim 2, wherein said specifying of the qualified name includes;
   specifying an interface name and a name of the first explicit interface member.

4. The method according to claim 1, wherein implementing in the class the first explicit interface member comprises:
   implementing in the class an internal interface not accessible to a consumer of said the class.

5. The method according to claim 1, wherein the second explicit interface member has the same return type as the first explicit interface member.

6. The method according to claim 1, wherein the second explicit interface members is included in a public interface of the class.

7. A method according to claim 1, wherein the first explicit interface member comprises a first version of a generic interface, and the second explicit interface member comprises a second version of the generic interface.

8. The method according to claim 1, wherein the class is programmed according to an object-oriented programming language.

9. The method according to claim 1, wherein an implementation of an explicit interface member is a method, property, event, or indexer declaration that references a fully qualified interface member name.

10. The method according to claim 1, wherein said the class names an interface in a base class list of the class that contains a member whose fully qualified name, type, and parameter types exactly match those of the implementation of the first explicit interface member.

11. The method according to claim 1, wherein it is not possible to override the first explicit interface member wherein the first explicit interface member calls another virtual method, and wherein a class derived from the class overrides the first explicit interface member.

12. The method according to claim 1, wherein the class re-implements an interface of the first explicit interface member by including the interface in the base class list of the class.

13. A computer readable storage medium including processor-executable instructions, the processor-executable instructions generated from a plurality of modules written in an object-oriented programming language, the instructions when executed on the processor, cause operations comprising:
   implementing in a class a first explicit interface having a first explicit interface member by explicityly specifying the relationship between the class and the first explicit interface member, the first explicit interface member mechanism being excluded from a public interface of the class;
   implementing in the class a second explicit interface having a second explicit interface member, the second explicit interface member having the same signature as the first explicit interface member, the signature comprising a member name, a number of one or more parameters, and a type for each of the number of one or more parameters;

after implementing in the class the first and second explicit interfaces, compiling the class into computer-executable instructions along with a call in the class to the first explicit interface member and a call in the class to the second explicit interface member, the call comprising an identifier of an explicit interface, and a corresponding identifier of an explicit interface member;

in response to processing a first instruction of the instructions corresponding to the call to the first explicit interface member, executing the call with the first explicit interface member to produce a first result;

storing the first result in a computer readable storage medium;

in response to processing a second instruction of the instructions corresponding to the call to the second explicit interface member, executing the call with the second explicit interface member to produce a second result; and storing the second result in the computer readable storage medium.

14. The computer readable storage medium according to claim 13, wherein said specifying of the relationship between the class and the first explicit interface member includes;
specifying a qualified name of the class.

15. The computer readable storage medium according to claim 14, wherein said specifying of the qualified name includes;
specifying a interface name and a name of the first explicit interface member.

16. The computer readable storage medium according to claim 13, wherein implementing in the class the first explicit interface member comprises:
implementing in the class an internal interface not accessible to a consumer of said class.

17. The computer readable storage medium according to claim 13, wherein the second explicit interface members is included in a public interface of the class.

18. The computer readable storage medium according to claim 13, wherein the second explicit interface members is included in a public interface of the class.

19. The computer readable storage medium according to claim 13, wherein the first explicit interface member comprises a first version of a generic interface, and the second explicit interface member comprises a second version of the generic interface.

20. The computer readable storage medium according to claim 13, wherein the object-oriented programming language is C.

21. The computer readable storage medium according to claim 13, wherein an implementation of an explicit interface member is a method, property, event, or indexer declaration that references a fully qualified interface member name.

22. The computer readable storage medium according to claim 13, wherein said the class names an interface in the base class list of the class that contains a member whose fully qualified name, type, and parameter types exactly match those of the implementation of the explicit interface member.

23. The computer readable storage medium according to claim 13, wherein it is not possible to override the first explicit interface member wherein the first explicit interface member calls another virtual method, and wherein a class derived from the class overrides the first explicit interface member.

24. The computer readable storage medium according to claim 13, wherein the class re-implements an interface of the first explicit interface member by including the interface in the base class list of the class.

25. A system for generating an object, comprising:
a processor; and
a memory communicatively coupled to the processor when the system is operational, the memory bearing processor-executable instructions that, when executed on the processor, cause:

implementing in a class a first explicit interface having a first explicit interface member by explicitly specifying the relationship between the class and the first explicit interface member, the first explicit interface member being excluded from a public interface of the class;

implementing in the class a second explicit interface having a second explicit interface member, the second explicit interface member having the same signature as the first explicit interface member, the signature comprising a member name, a number of one or more parameters, and a type for each of the number of one or more parameters;

after implementing in the class the first and second explicit interfaces, compiling the class into computer-executable instructions along with a call in the class to the first explicit interface member and a call in the class to the second explicit interface member, the call comprising an identifier of an explicit interface, and a corresponding identifier of an explicit interface member;

in response to processing a first instruction of the instructions corresponding to the call to the first explicit interface member, executing the call with the first explicit interface member to produce a first result;

storing the first result in a computer readable storage medium;

in response to processing a second instruction of the instructions corresponding to the call to the second explicit interface member, executing the call with the second explicit interface member to produce a second result; and storing the second result in the computer readable storage medium.

26. The system of claim 25, wherein said specifying a relationship between the first member and the name of the interface includes;
specifying a qualified name of the class.

27. The system of claim 26, wherein said specifying a qualified name includes;
specifying an interface name and a name of the first explicit interface member.

28. The system of claim 25, wherein implementing in the class the first explicit interface member comprises:
implementing in the class an internal interface that is not accessible to a consumer of said class.

29. The system of claim 25, wherein the second explicit interface member has the same return type as the first explicit interface member.

30. The system of claim 25, wherein the second explicit interface members is included in a public interface class.

31. The system of claim 25, wherein the first explicit interface member comprises a second version of a generic interface, and the second explicit interface member comprises a second version of the generic interface.

32. The system of claim 25, wherein the class is implemented in an object-oriented programming language.

33. The system of claim 25, wherein said implemented first explicit interface member is a member selected from a group of members consisting of a method, a property, an event, and an indexer declaration that references a fully qualified interface member name.

34. The system of claim 25, wherein said class names an interface in a base class list of the class that contains a member whose fully qualified name, type, and parameter types exactly match those of the implemented first explicit interface member.

35. The system of claim 25, wherein it is not possible to override the first explicit interface member wherein the first explicit interface member calls another virtual method, and wherein a class derived from the class overrides the first explicit interface member.

36. The system of claim 25, wherein said class re-implements an interface of the first explicit interface member by including the interface in the base class list of the class.

* * * * *